(12) United States Patent
Diard (10) Patent No.: US 10,118,095 B2
(45) Date of Patent: Nov. 6, 2018

(54) IMPLEMENTING A REMOTE GAMING SERVER ON A DESKTOP COMPUTER

(71) Applicant: NVIDIA Corporation, Santa Clara, CA (US)

(72) Inventor: Franck R. Diard, Saint-Contest (FR)

(73) Assignee: NVIDIA CORPORATION, Santa Clara, CA (US)

( * ) Notice: Subject to any disclaimer, the term of this patent is extended or adjusted under 35 U.S.C. 154(b) by 663 days.

(21) Appl. No.: 13/715,596

(22) Filed: Dec. 14, 2012

(65) Prior Publication Data

US 2014/0171190 A1 Jun. 19, 2014

(51) Int. Cl.
| | | |
|---|---|---|
| *G06F 9/54* | (2006.01) | |
| *A63F 13/355* | (2014.01) | |
| *A63F 13/53* | (2014.01) | |
| *G06T 15/00* | (2011.01) | |

(52) U.S. Cl.
CPC ............ *A63F 13/355* (2014.09); *A63F 13/53* (2014.09); *G06F 9/54* (2013.01); *G06T 15/005* (2013.01); *G06F 2209/542* (2013.01); *G06T 2200/16* (2013.01)

(58) Field of Classification Search
CPC ..... G06F 9/54; G06F 2209/542; A63F 13/355
See application file for complete search history.

(56) References Cited

U.S. PATENT DOCUMENTS

| | | | | |
|---|---|---|---|---|
| 6,421,738 B1* | 7/2002 | Ratan et al. | ................. | 719/328 |
| 2003/0001854 A1* | 1/2003 | Jade et al. | .................... | 345/581 |
| 2003/0163602 A1* | 8/2003 | Johnson et al. | .............. | 709/328 |
| 2004/0088684 A1* | 5/2004 | Gazdik et al. | ................ | 717/133 |
| 2008/0172681 A1* | 7/2008 | Donald et al. | ................ | 719/320 |

(Continued)

FOREIGN PATENT DOCUMENTS

| | | |
|---|---|---|
| CN | 102662999 A | 9/2012 |
| TW | 200943079 A | 10/2009 |

OTHER PUBLICATIONS

Jurgelionis, A.; Bellotti, F.; De Gloria, A.; Eisert, P.; Laulajainen, J.P.; Shani, A., "Distributed Video Game Streaming System for Pervasive Gaming" (Sep. 21, 2009), in: Streaming Day 2009, Genoa, pp. 1-6 [retrieved from http://www.ki.informatik.hu-berlin.de/viscom/papers/streamingday09.pdf].*

(Continued)

*Primary Examiner* — Brian W Wathen
(74) *Attorney, Agent, or Firm* — Artegis Law Group, LLP (57) ABSTRACT

One embodiment of the invention sets forth a method that includes receiving a request from a client device to launch an application program for execution on a server device, where the application program is configured to operate in a full-screen display mode, and, in response, creating an execution environment for the application program that disables the full-screen display mode. Within the execution environment, the application program is configured to generate the rendered image data for display on the client device. With the disclosed approach, application programs that are configured to execute on an application server computer system in a full-screen display mode can be executed through an execution environment that includes a shim layer configured to disable the full-screen display mode and transmit the render image data to a client device for display.

21 Claims, 6 Drawing Sheets

(56) References Cited

U.S. PATENT DOCUMENTS

| | | | | |
|---|---|---|---|---|
| 2010/0167809 | A1* | 7/2010 | Perlman et al. | 463/24 |
| 2010/0332984 | A1* | 12/2010 | Tzruya | 715/716 |
| 2011/0157196 | A1* | 6/2011 | Nave et al. | 345/522 |
| 2013/0057561 | A1* | 3/2013 | Nave et al. | 345/522 |
| 2013/0293557 | A1* | 11/2013 | Diard | G06F 9/45533 345/522 |
| 2014/0059528 | A1* | 2/2014 | Gagliardi | G06F 11/3644 717/170 |

OTHER PUBLICATIONS

Watson, M., "OnLive Demo: Future of Gaming" (Jul. 24, 2010), pp. 1-22 [retrieved from https://www.youtube.com/watch?v=jG6Ahg_d_BU].*

Laikari, A.; Fechteler, P.; Eisert, P.; Jurgelionis, A.; Bellotti, F.; De Gloria, A., "Games@Large Distributed Gaming System" (Sep. 28-30, 2009), Presented at 2009 NEM Summit, Saint-Malo, France, pp. 1-6 [retrieved from http://www.ki.informatik.hu-berlin.de/viscom/papers/nem_summit09.pdf].*

Eisert, P.; Fechteler, P., "Remote Rendering of Computer Games" (Jul. 2007), Proc. Intern. Conf. on Signal Processing and Multimedia Applications (SIGMAP), Barcelona, Spain, pp. 1-6 [retrieved from http://iphome.hhi.de/fechteler/papers/sigmap2007_EisertFechteler.pdf].*

Nave, I.; David, H.; Shani, A.; Laikari, A.; Eister, P.; Fechteler, P., "Games@Large Graphics Streaming Architecture" (Apr. 14-16, 2008), IEEE International Symposium on Consumer Electronics, pp. 1-4 [retrieved from http://ieeexplore.ieee.org/xpls/abs_all.jsp?arnumber=4559473].*

Jurgelionis, et al., "Platform for Distributed 3D Gaming" (2009), International Journal of Computer Games Technology, vol. 2009, Article ID 231863, pp. 1-15 [retrieved from http://dl.acm.org/citation.cfm?id=1595407].*

Wymann, B., "The Official TORCS FAQ (frequently asked questions)" (Oct. 19, 2012), pp. 1-15 [retrieved from http://torcs.sourceforge.net/index.php?name=sections&op=printpage&artid=30].*

Hunt, G.; Brubacher, D., "Detours: Binary Interception of Win32 Functions" (Jul. 1999), Proceedings of the Third USENIX Windows NT Symposium, pp. 1-9 [retrieved from http://research.microsoft.com/pubs/68568/huntusenixnt99.pdf].*

Fisher, M., "Direct3D 9 API Interceptor" (Feb. 14, 2011) pp. 1-7 [retrieved from https://web.archive.org/web/20110214002602/http://graphics.stanford.edu/~mdfisher/D3D9Interceptor.html].*

Koch, M., "Intercept Calls to DirectX with a Proxy DLL" (Feb. 28, 2006), pp. 1-9 [retrieved from http://www.codeguru.com/cpp/g-m/directx/directx8/article.php/c11453/Intercept-Calls-to-DirectX-with-a-Proxy-DLL.htm].*

Wikipedia, "Shim (computing)" (Aug. 14, 2012), pp. 1-2 [retrieved from https://en.wikipedia.org/w/index.php?title=Shim_(computing)&oldid=507329824].*

Luna, F., "Introduction to 3D Game Programming with DirectX® 9.0" (2003), Wordware Publishing, Inc., pp. 156-158.*

Sourceforge.net, "General Configuration Options" (Feb. 1, 2012), pp. 1-5 [retrieved from https://web.archive.org/web/20120201221402/http://torcs.sourceforge.net/index.php?name=Sections&op=viewarticle&artid=10&page=3].*

Windows Dev Center, "Windows Features" (Nov. 3, 2012), pp. 1-11 [retrieved from https://web.archive.org/web/20121103053713/http://msdn.microsoft.com/en-us/library/windows/desktop/ms632599(v=vs.85).aspx].*

* cited by examiner

IMPLEMENTING A REMOTE GAMING SERVER ON A DESKTOP COMPUTER

BACKGROUND OF THE INVENTION

Field of the Invention

The present invention generally relates to a server-client system and more specifically to implementing a remote game application server on a computing system.

Description of the Related Art

When a game application executes on a conventional computing system, the gaming application configures the display device to operate in full-screen mode such that only image frames rendered by the game application are visible to the user.

One drawback to the full-screen mode is that the user is not able to see output images produced by another application program while the game application is executed and displayed. Therefore, a user playing a game application is unable to simultaneously operate or interact with another application program running on the same computer. In a situation when the user wants to play a game and operate a non-game application on the same computer the user will not be able to see output images produced by the non-game application because the game application requires the full-screen mode. Similarly if a second user wants to play a game application on the computer while the user executes a different (non-game) application on the same computer, the second user will not be able to see output images produced by the non-game application because the game application requires the full-screen mode.

Accordingly, what is needed in the art is an approach that allows a first user to play a game application executed by a conventional computing system while the same user or a second user is able to operate and see output images produced by a non-game application program on the conventional computing system.

SUMMARY OF THE INVENTION

One embodiment of the invention sets forth a method for providing rendered image data to a client device. The method includes receiving a request from a client device to launch an application program for execution on a server device, where the application program is configured to operate in a full-screen display mode, and, in response, creating an execution environment for the application program that disables the full-screen display mode. Within the execution environment, the application program is configured to generate the rendered image data for display on the client device.

One advantage of the disclosed approach is that application programs that are configured to execute on an application server computer system in a full-screen display mode can be executed through an execution environment that includes a shim layer configured to disable the full-screen display mode and transmit the render image data to a client device for display. Application programs do not need to be modified in order to display rendered image data on a client device or to transmit commands to the application server computer system using the disclosed approach.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

One embodiment of the present invention sets forth a system and method for providing rendered image data to a client device. Rendered image data generated by an application program designed to operate in a full-screen display mode is transmitted to the client device from a computing system (application server computer) that executes the application program. The full-screen display mode used by the application program, e.g., a game, may be disabled by executing the application program through a shim layer. More specifically, a server process, after loading the application program for execution on the application server computer system, sets up the shim layer, which provides an execution environment for the application program without requiring any modification of the application program itself. In particular, the server process alters the execution path of the application program such that the application program calls the shim layer for various library functions, including DLLs. At run-time, non-display oriented function calls are transmitted from the application program, through the shim layer, to the runtime components for execution. For function calls related to displaying rendered images, the function calls are transmitted from the application program to the shim layer, and the shim layer executes those function calls.

When the application program is executed through the shim layer, rendered images generated by the application program are transmitted to a client device for display. A first user is thus able to play the application program using a client device, where the application program is executed by a first computing system, and a second user is able to simultaneously operate and see output images produced by a non-game application program on the first computing system. The client device is operated by the first user and transmits commands to the computing system for processing by the application program.

System Overview

Figure 1A:
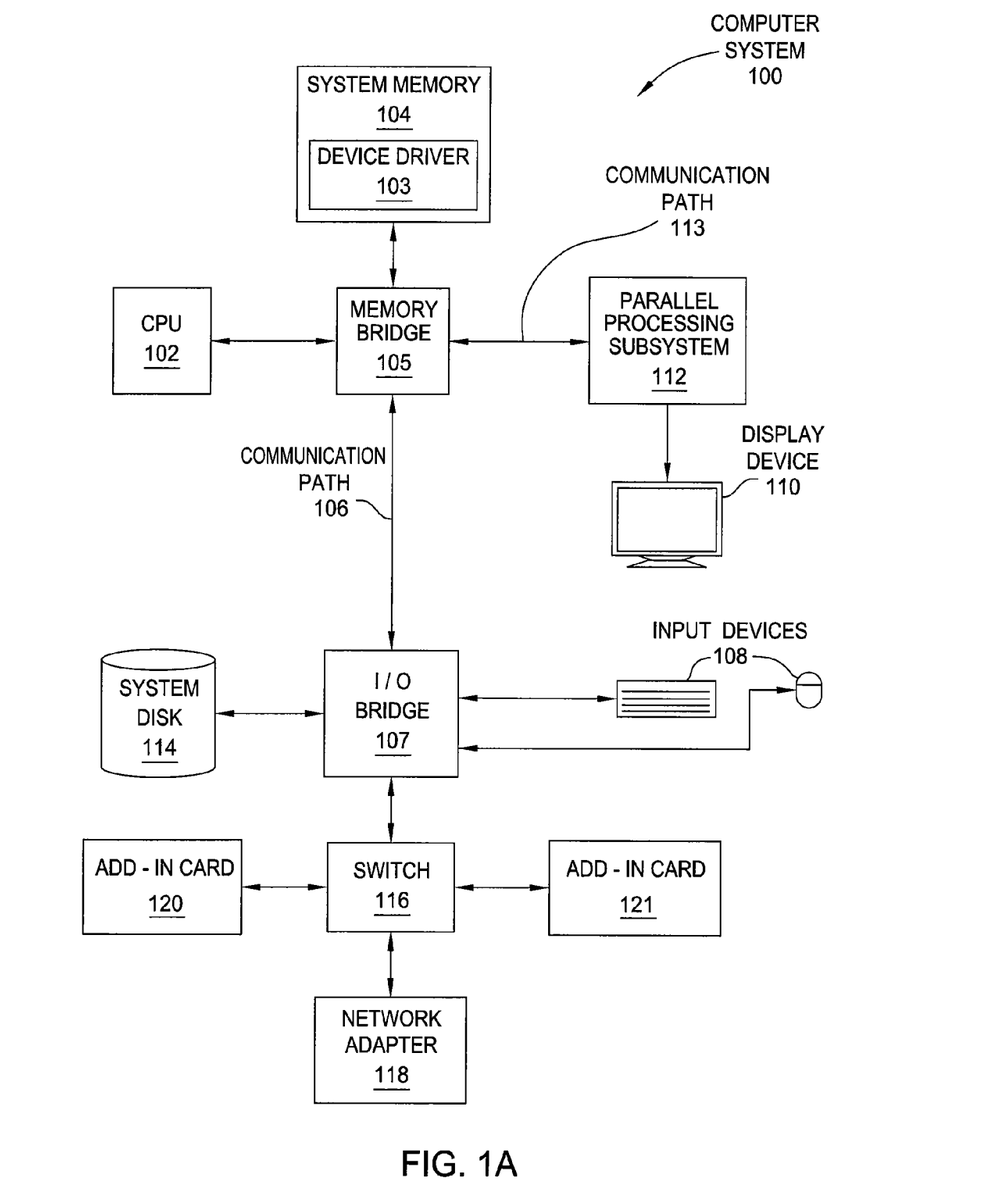
FIG. 1A is a block diagram illustrating a computer system configured to implement one or more aspects of the present invention.

FIG. 1A is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and may include one or more graphics processing units (GPUs). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

In one embodiment, the parallel processing subsystem 112 includes one or more GPUs that may be implemented using one or more integrated circuit devices, such as programmable processors, application specific integrated circuits (ASICs), or memory devices, or in any other technically feasible fashion. In some embodiments, some or all of the GPUs in parallel processing subsystem 112 have rendering pipelines that can be configured to perform various operations related to generating pixel data from graphics data supplied by CPU 102 and/or system memory 104 via memory bridge 105 and the second communication path 113, interacting with local parallel processing memory that is included within the parallel processing subsystem 112 (which can be used as graphics memory including, e.g., a conventional frame buffer) to store and update pixel data, delivering pixel data to display device 110, and the like. In some embodiments, parallel processing subsystem 112 may also include one or more other processing units that are used for general-purpose computations. The GPUs and/or other processors in parallel processing subsystem 112 may be identical or different, and each such GPU or processing unit may have a dedicated parallel processing memory device(s) or no dedicated parallel processing memory device(s). In some embodiments, one or more of the GPUs in parallel processing subsystem 112 may output data to one or more display devices 110.

In operation, CPU 102 is the master processor of computer system 100, controlling and coordinating operations of other system components. In particular, CPU 102 issues commands that control the operation of the GPUs. In some embodiments, CPU 102 writes a stream of commands for each GPU to a data structure (not explicitly shown in FIG. 1A) that may be located in system memory 104, parallel processing memory, or another storage location accessible to both CPU 102 and the GPUs. A pointer to each data structure is written to a pushbuffer to initiate processing of the stream of commands in the data structure. A GPU reads command streams from one or more pushbuffers and then executes commands asynchronously relative to the operation of CPU 102. Execution priorities may be specified for each pushbuffer by an application program via the device driver 103 to control scheduling of the different pushbuffers.

The GPUs and other processors in parallel processing subsystem 112 communicate with the rest of computer system 100 via communication path 113, which connects to memory bridge 105 (or, in one alternative embodiment, directly to CPU 102). In one embodiment, communication path 113 is a PCI Express link, in which dedicated lanes are allocated to each processing unit within the parallel processing subsystem 112, as is known in the art. Other communication paths may also be used. The connection of the parallel processing subsystem 112 to the rest of computer system 100 may also be varied.

In some embodiments, parallel processing subsystem 112 is implemented as an add-in card that can be inserted into an expansion slot of computer system 100. In other embodiments, one or more GPUs can be integrated on a single chip with a bus bridge, such as memory bridge 105 or I/O bridge 107. In still other embodiments, some or all elements of the parallel processing subsystem 112, including the one or more GPUs, may be integrated on a single chip with CPU 102 to form a system-on-chip (SoC). Systems incorporating one or more GPUs may be implemented in a variety of configurations and form factors, including desktop, laptop, or handheld personal computers, servers, workstations, game consoles, embedded systems, and the like.

Application Program Server-Client System

Figure 1B:
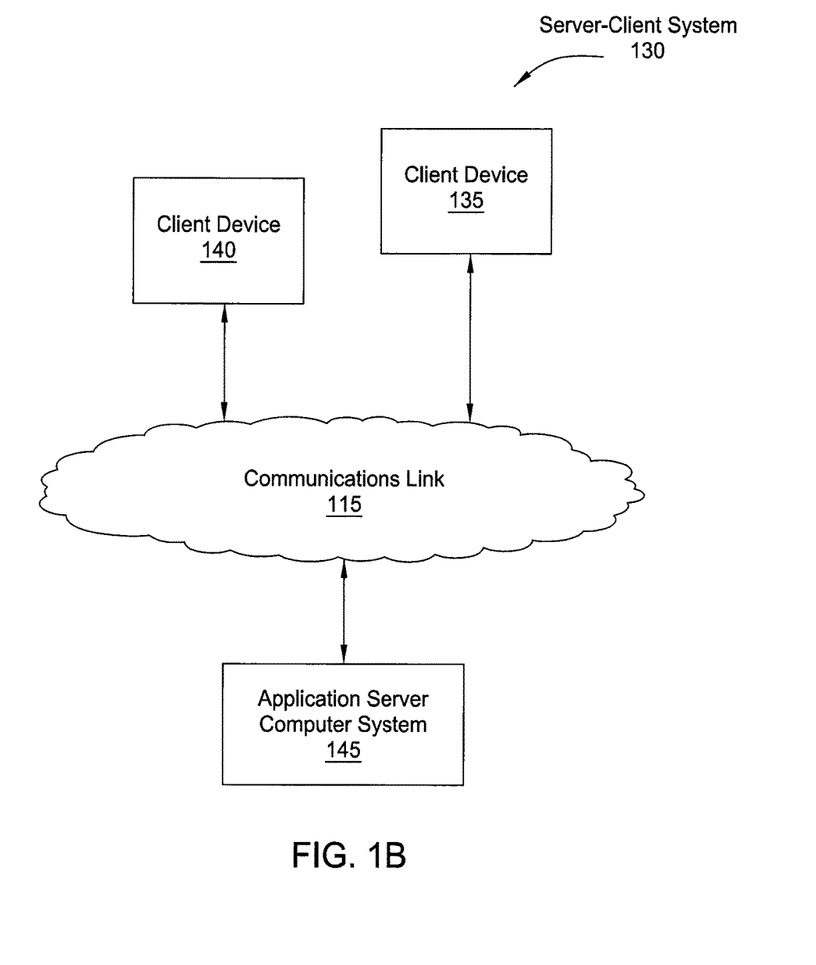
FIG. 1B is a diagram illustrating a server-client system configured to implement one or more aspects of the present invention.

FIG. 1B is a diagram illustrating a server-client system 130 configured to implement one or more aspects of the present invention. As shown, the server-client system 130 includes an application server computing system 145, a client device 140, a client device 135, and a communications link 115.

The client devices 135 and 140 may each be configured to execute a client process that communicates with an application server process executed by the application server computing system 145 via the communications link 115. The client process allows a user to remotely connect to the application server computing system 145 such that any graphics that is rendered by an application program designed to operate in full-screen mode on the application server computing system 145 is transmitted to and displayed on the client device 135 and/or 140.

In operation, the server process, when initialized on the application server computing system 145, waits until a connection is initiated by the client process. When initiating a connection, the client process may transmit additional information such as the resolution of a display device (not shown) coupled to the client device 135 and/or 140. In response to a connection from the client process, the server process first transmits a list of application programs that may be executed by the application server computing system 145 to the client process via the communications link 115. When a user selects an application program from the list, the selection information is transmitted to the application server computing system 145, and the application server computing system 145 begins to collect graphics data that was rendered for display on a display device (not shown) coupled to the application server computing system 145. The client process receives the graphics data from the server process and displays the graphics data on the display device coupled to the respective client device 135 and/or 140. The transmission from the server process to the client process continues until the client process terminates the connection between the server process and the client process. In addition, the client process collects inputs, such keyboard key strokes or mouse inputs, at the client device 135 and/or 140 and transmits the inputs to the server process. The server process captures the received inputs and causes the inputs to effect the operation of the selected application program executing within the application server computing system 145.

The communications link 115 includes a plurality of network communications systems, such as routers and switches, configured to facilitate data communication between the client process and the server process. Persons skilled in the art will recognize that many technically feasible techniques exist for building the communications link 115, including technologies practiced in deploying the well-known internet communications network.

The application server computing system 145 and the client devices 135 and 140 may be any type of computing device including, but not limited to, a desktop personal computer (PC), a laptop, a tablet PC, a personal digital assistant (PDA) or a mobile device, such as a mobile phone. In one embodiment, the application server computing system 145 is a desktop computing system and the client devices 135 and 140 are portable devices located within the same building structure, such as a home or school.

A plurality of client devices, can connect to the application server computing system 145 simultaneously via corresponding client processes. In one embodiment, the server-client system 130 does not use virtualization and allows several users to simultaneously execute different game application programs on a single application server computing system 145. The users of the client devices 135 and 140 connect and interact remotely with the game application programs stored on the application server computing system 145. One or more game application programs designed to operate in full-screen display mode may be executed on the application server computing system 145 by a combination of one or more CPU and/or GPU cores and rendered images are transmitted over the communications link 115 to the client devices 135 and/or 140.

Figure 2:
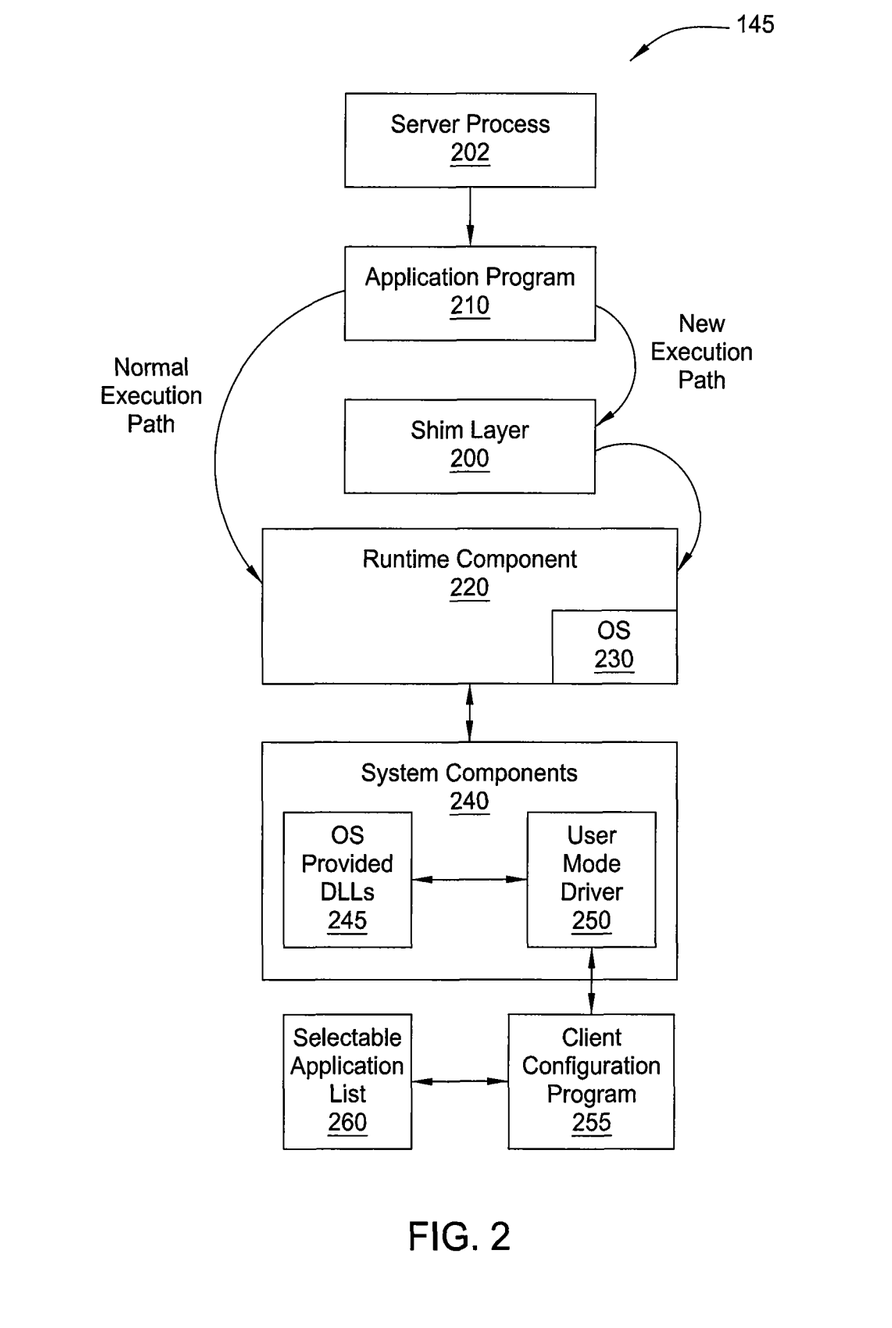
FIG. 2 is a conceptual illustration of the application server computer system of FIG. 1B, according to one embodiment of the present invention.

FIG. 2 is a conceptual illustration of the application server computer system 145 of FIG. 1B, according to one embodiment of the present invention. As shown, the application server computer system 145 includes, without limitation, a server process 202, an application program 210, a shim layer 200, a runtime component 220, and system components 240. Additional application programs may also be installed and stored in the system memory 104. The runtime component 220 includes an operating system 230, e.g., Microsoft Windows, MacOS, Linux, and the like. The system components 240 include DLLs (dynamic link libraries) 245 such as the Microsoft D3D DLLs provided by the OS 230. The system components 240 also include a user mode driver 250 that is typically provided to enable communication between the OS 230 and one or more processors, e.g., GPUs, that may be installed in the application server computer system 145. In one embodiment, the user mode driver 250 is a D3D user mode driver interface that is provided by NVIDIA Corporation.

As also shown, the application server computer system 145 includes a client configuration program 255 is configured to generate a selectable application list 260. The selectable application list 260 includes one or more application programs 210 that may be selected by a user of a client device 135 and/or 140. The selectable application list 260 may be created based on inputs received from a user of the application server computing system 145. In one embodiment, the user may specify particular permissions for the different client devices 135 and 140 to control the number of client devices that may launch each application program or to control the total number of client devices that may simultaneously connect to the application server computing system 145. Permissions may also be specified to control the type of client device that may launch one or more of the application programs in the selectable application list 260.

Finally, the shim layer 200 is set up by the server process 202 after the selected application program 210 is loaded on the application server computer system 145 for execution. A separate shim layer 200 is generated for each selected application program and client device 130. For example, when the same application program is selected for client device 135 and 140, two different shim layers 200 are generated by the user mode driver 250. As described in greater detail herein, the selected application program 210 is executed through the shim layer 200 so that rendered images intended for display on the application server computing system 145 in full-screen display mode are transmitted to the client device 135 or 140. Typically, the rendered images generated by the selected application program are not displayed on the display device directly coupled to the application server computing system 145. However, in different embodiments, the rendered images generated by the selected application program may also be displayed on a display device that is directly coupled to the application server computing system 145. In such embodiments, the rendered images could be displayed as full-screen images or in smaller windows with the display of the display device that is directly coupled to the application server computer system 145.

Figure 3:
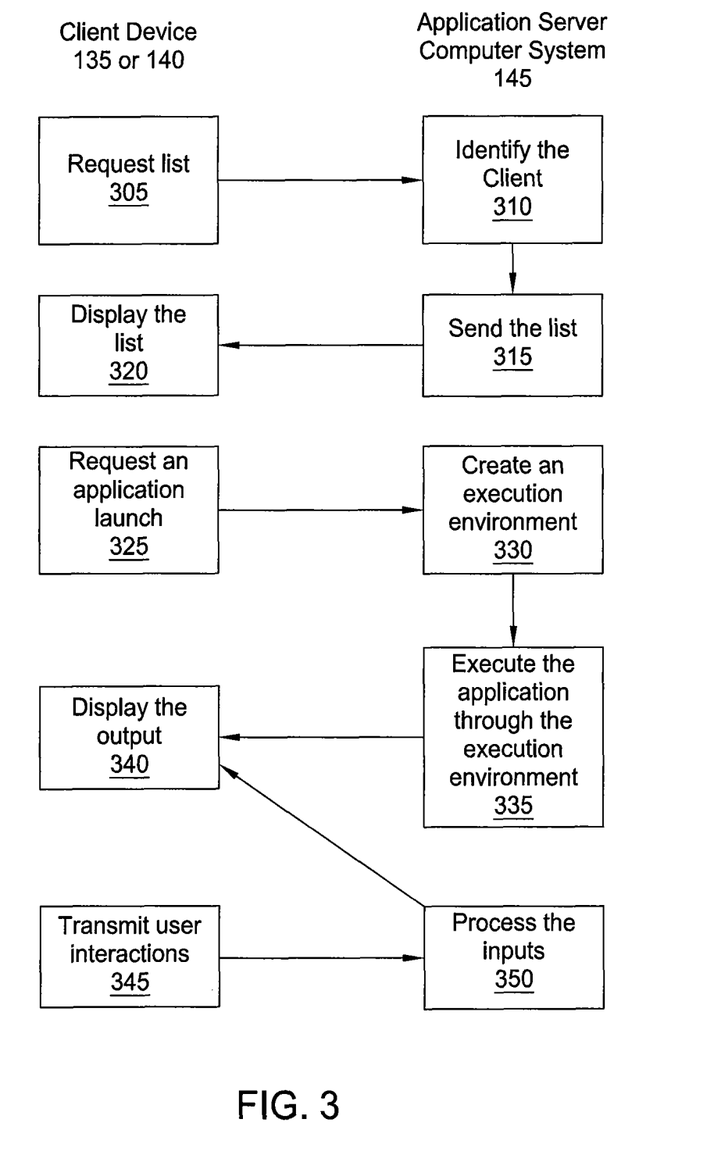
FIG. 3 is a conceptual diagram of the interactions between one of the client devices and the application server computing system of FIG. 2, according to one embodiment of the present invention.

FIG. 3 is a conceptual diagram of the interactions between one of the client devices 135 or 140 and the application server computing system 145 of FIG. 2, according to one embodiment of the present invention. Once the client device 135 or 140 is connected to the application server computing system 145, at interaction 305, the client device 135 or 140 requests the selectable application list 260 from the application server computing system 145. When the application server computing system 145 receives the request, at interaction 310, the application server computing system 145 identifies the particular client. At interaction 315, the application server computing system 145 sends the selectable application list 260 to the client. The selectable application list 260 that is sent may be specific to the identified client device or the selectable application list 260 may be tailored for all client devices.

At interaction 320, the client process executing on the client device 135 or 140 presents the selectable application list 260 to the user. At interaction 325, the user of the client device 135 selects an application 210 from the selectable application list 260, and a request to launch the selected application program is transmitted to the application server computing system 145.

At interaction 330, the server process 202 executing on the application server computing system 145 receives the request to launch the selected application program 210 and, in turn, loads the selected application program 210 for execution on the application server computer system 145. The server process 202 also sets up the shim layer 200 to provide an execution environment for the selected application program 210 that includes the shim layer 200 and the runtime components 220. In particular, the server process 202 alters the execution path of the selected application program 210 (from the "normal" to a "new" execution path) such that the selected application program 210 calls the shim layer 200 for various library functions, including DLLs. At run-time, non-display oriented function calls are transmitted from the selected application program 210, through the shim layer 200, to the runtime components 220 for execution. For function calls related to displaying rendered images, the function calls are transmitted from the selected application program 210 to the shim layer 200, and the shim layer 200 executes those function calls.

In one embodiment, the shim layer 200 is a Microsoft DirectX wrapper configured to prevent the selected application program 210 from outputting data to the display device that is directly coupled to the application server computing system 145. The shim layer 200 also prevents user inputs received at input devices of the application server computing system 145 from controlling operation of the selected application program 210.

In operation, the shim layer 200 overrides the full-screen display mode specified by the selected application program 210. When the full-screen display mode is disabled, the copy display mode is used (buffer swapping). In full-screen display mode buffer swapping is employed to avoid the copy operation by storing alternating frames in two different portions of memory and alternating between the two different portions of memory, writing one portion of memory while displaying the other. Because the rendered image will not be displayed on the display device that is directly coupled to the application server computing system 145, the copy operation is not needed. Therefore, the shim layer 200 also sets a flag to hide the window to which the rendered image is copied.

Rendered image data produced by execution of the selected application program 210 on the application server computing system 145 is simply output to a buffer and then transmitted to the client device 135 or 140. Finally, the shim layer 200 also creates an execution thread to process input signals generated when the user of the client device 135 or 140 interacts with the input device of the client device 135 or 140. The input signals are transmitted from the client device 135 or 140 to the server computing system 145 to control the selected application program 210. TABLE 1 illustrates an example of pseudo code for an application program designed to operate in full-screen display mode.

TABLE 1

Create new window
Present parameters, full-screen display mode flag = FALSE;
Create device (new window handle, present parameters)
    hide new window
    Rendering context...
    Rendering loop {...
    }
    Present call to display First a new window is created and a pointer to a location in memory corresponding to a display buffer is returned, e.g., new window handle. The present parameters include a flag for full-screen display mode that is set to enable the full-screen display mode for the application program. In the shim layer 200, the flag for full-screen display mode is disabled. Present parameters may also include the display resolution of the client device 135 or 140.

A device is created for the new window with the present parameters set by the shim layer 200. Then the new window is set so that it is not visible to avoid the copy operation. Once the new window is set to not be visible, rendering can proceed without modification, and the shim layer 200 is configured to direct the execution of the selected application program 210, as described above. Consequently, the selected application program 210 does not require any modifications to execute through the shim layer 200 compared to executing without the shim layer 200, i.e., full-screen display mode with output to the display device that is directly coupled to the application computing server system 145.

At interaction 335, the selected application program 210 is executed on the application server computing system 145 through the execution environment that includes the shim layer 200 and the runtime components 220. At interaction

340, rendered images stored in memory on the application server computing system 145 are transmitted to the client device 135 or 140 and displayed at the output of the client device 135 or 140. At interaction 345, the user of the client device 135 or 140 generates input signals to control the selected application program and the input signals are transmitted to the application server computing system 145. At interaction 350, a thread executing on the application server computing system 145 processes the input signals, and additional rendered images are transmitted to the client device 135 or 140.

Execution of the selected application program 210 does not disturb a user of the application server computing system 145 that may be accomplishing completely unrelated tasks, such as web browsing or audio and video tasks (watching DVD). The shim layer 200 enables the selected application program 210 to be executed without any modification to the application program code by providing an execution environment that disables the full-screen display mode, as described above. The execution environment may also be configured to set a display resolution that is specific to the client device 135 or 140.

Figure 4A:
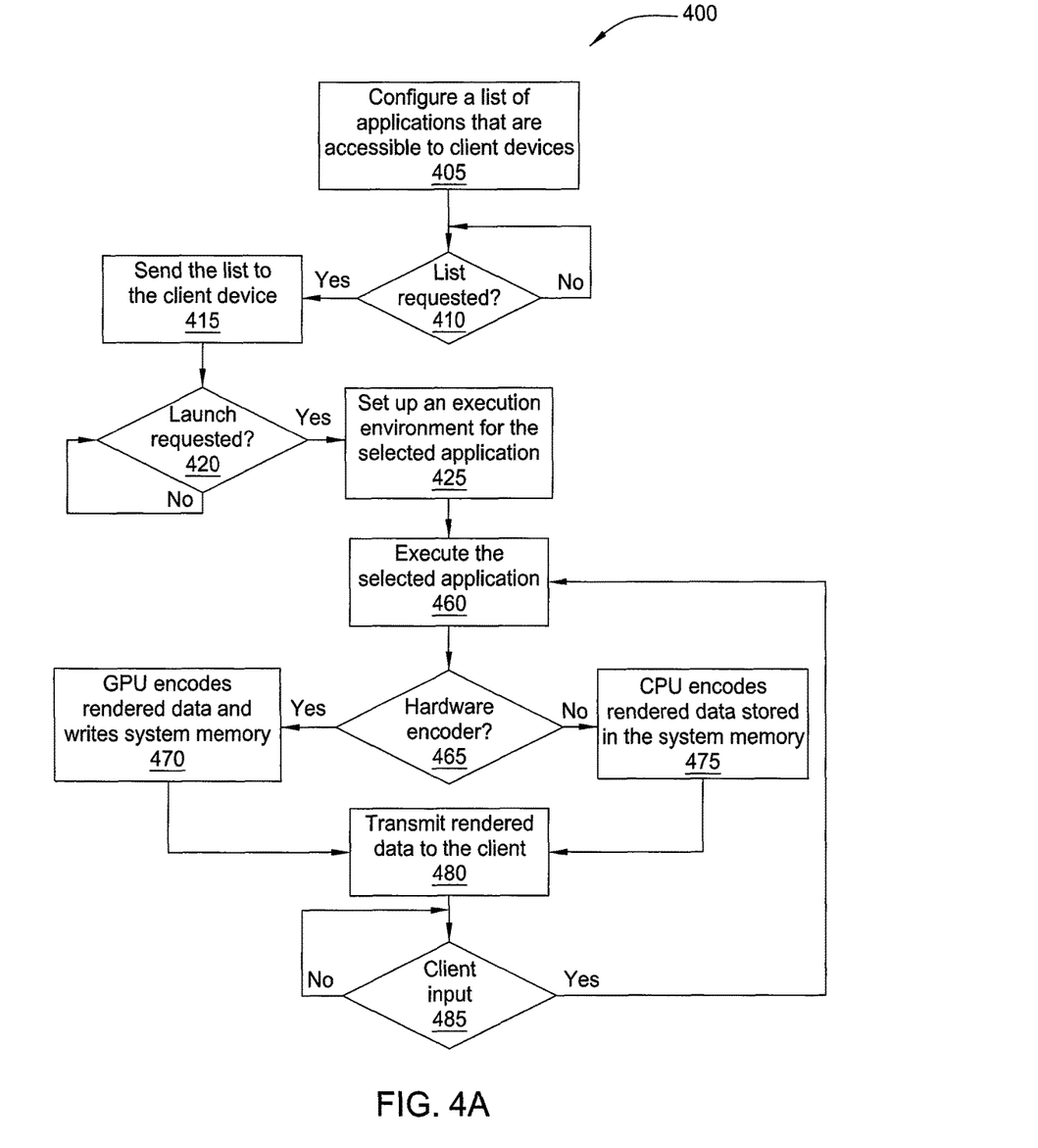
FIG. 4A is a flow diagram of method steps for generating rendered images for display on a client device, according to one embodiment of the present invention.

FIG. 4A is a flow diagram of method steps for generating rendered images for display on a client device, according to one embodiment of the present invention. Although the method steps are described in conjunction with the systems of FIGS. 1A, 1B, and 2, persons of ordinary skill in the art will understand that any system configured to perform the method steps, in any order, is within the scope of the invention.

As shown, a method 400 begins at step 405, where the selectable application list 260 is configured by the client configuration program 255 executing on the application server computer system 145 to include the application programs installed on the application server computing system 145 that are accessible to the client devices 135 and 140. At step 410, the server process 202 executing on the application server computer system 145 determines whether the selectable application list 260 is requested by a client process, and, if not, the server process 202 waits for a request. When a request for the selectable application list 260 is received, at step 415, the application server computing system 145 transmits the selectable application list 260 to the requesting client device.

At step 420, the server process 202 determines if a launch request is received from a client device 135 or 140. If a launch request is not received, then the method 400 returns to step 420. If a launch request is received, then, at step 425, the server process 202 loads the application program 210 selected from the selectable application list 260 for execution on the application server computer system 145 and sets up the shim layer 200, as previously described herein, to create an execution environment for the selected application program 210 that disables the full-screen display mode used by the selected application program 210. Note that a more detailed description of step 425 is set forth below in conjunction with FIG. 4B.

At step 460, the selected application program 210 is executed within the execution environment to generate the rendered image data. More specifically, as also previously described herein, the execution environment includes the shim layer 200 and the runtime components 220, and the selected application program 210 is executed through the shim layer 200 and, as needed, through the runtime components 220. At step 465, the selected application program 210 determines if a hardware encoder is available within the application server computing system 145. If so, then, at step 470, a GPU within the application server computer system 145 encodes the rendered image data and writes the encoded rendered image data to a buffer in system memory. Otherwise, at step 475, the CPU within the application server computer system 145 encodes the rendered image data using a software encoder and writes the encoded rendered image data to a buffer in the system memory 104. The software or hardware encoder may be configured to convert rendered image data in an RGB format into a YUV format. When a hardware encoder is available, the rendered image data may be stored in a frame buffer within graphics memory associated with the GPU within the application server computer system 145. When a hardware encoder is not available, the rendered image data is stored in system memory.

At step 480, the encoded rendered image data is transmitted to the client device 135 or 140. At step 485, the execution thread determines if an input signal is received from the client device 135 or 140. If so, then, at step 460, the selected application program 210 is executed to process the input signal. Otherwise, the execution thread waits for an input signal from the client device 135 or 140.

Figure 4B:
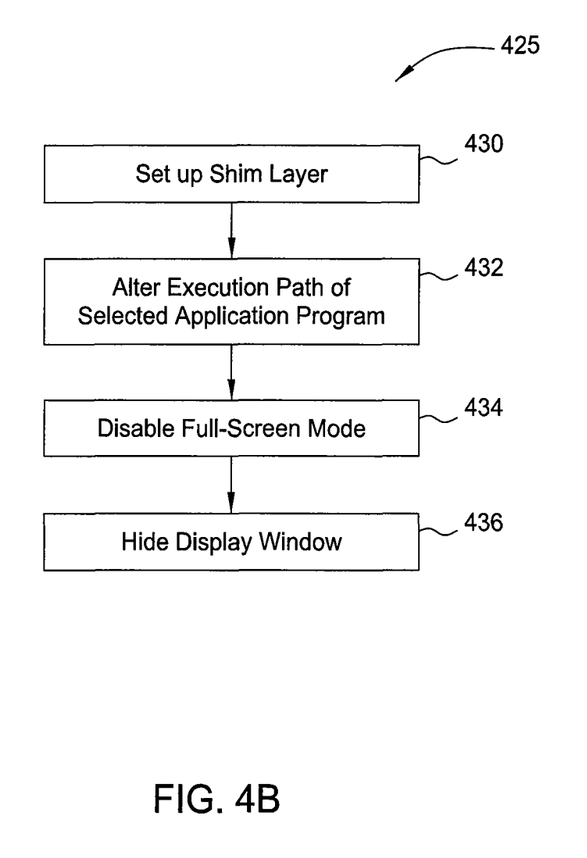
FIG. 4B is a flow diagram illustrating a particular step of FIG. 4A, according to one embodiment of the present invention.

FIG. 4B is a flow diagram illustrating step 425 of FIG. 4A, according to one embodiment of the present invention. Although the method steps are described in conjunction with the systems of FIGS. 1A, 1B, and 2, persons of ordinary skill in the art will understand that any system configured to perform the method steps, in any order, is within the scope of the invention.

At step 430, after loading the selected application program 210 for execution on the application server computer system 145, the server process 202 sets up the shim layer 200 within the application server computer system 145. At step 432, the server process alters the normal execution path of the selected application program 210 with a path to the shim layer 200 such that the selected application program 210 calls the shim layer 210 for various library calls, including DLLs. At run-time, non-display oriented function calls are transmitted from the selected application program 210, through the shim layer 200, to the runtime components 220 for execution. For function calls related to displaying rendered images, the function calls are transmitted from the selected application program 210 to the shim layer 200, and the shim layer 200 executes those function calls.

At step 434, the shim layer 200 disables the full-screen display mode used by the selected application program 210. At step 436, the shim layer 200 hides the display window so that rendered images generated during execution of the selected application program 210 on the application server computer system 145 are not copied to a display buffer on the application server computing system 145.

One advantage of the disclosed approach is that application programs that are configured to execute on an application server computer system in a full-screen display mode can be executed through an execution environment that includes a shim layer configured to disable the full-screen display mode and transmit the render image data to a client device for display. Application programs do not need to be modified in order to display rendered image data on a client device or to transmit commands to the application server computer system using the disclosed approach.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A method for providing rendered image data to multiple client devices, the method comprising:
receiving a request from a first client device and a second client device to launch an application program for execution on a server device, wherein the application program is configured to operate in a full-screen display mode; and
in response, creating an execution environment for the application program that includes a first shim layer and a second shim layer residing between the application program and a runtime component, wherein the first shim layer is associated with the first client device and the second shim layer is associated with the second client device, and each of the first shim layer and the second shim layer is configured to:
disable the full-screen display mode;
intercept function calls related to displaying rendered images and execute the function calls to store the rendered image data in a buffer of the server device;
pass non-display oriented function calls to the runtime component to allow the application program to generate the rendered image data for display on the associated client device; and
prevent user inputs received at input devices associated with the server device from controlling operation of the application program.

2. The method of claim 1, further comprising determining whether a request for a selectable application list has been received, wherein the application program is included in the selectable application list.

3. The method of claim 1, wherein the runtime component includes an operating system.

4. The method of claim 1, wherein creating the execution environment further comprises altering an execution path of the application program.

5. The method of claim 4, wherein altering the execution path comprises creating a path to each of the first shim layer and the second shim layer such that the application program calls the first shim layer or the second shim layer for library calls.

6. The method of claim 1, wherein creating the execution environment comprises hiding a display window for the rendered image data on a display device coupled to the application server computer.

7. The method of claim 6, wherein hiding the display window prevents the rendered image data from being copied to a display buffer within the server device.

8. The method of claim 1, wherein the rendered image data is generated at a display resolution specified by the associated client device.

9. The method of claim 1, wherein the application program comprises a gaming application.

10. The method of claim 1, further comprising executing a second application program on the server device, and causing image data generated by the second application program to be displayed on a display device that is directly coupled to the server device.

11. A non-transitory computer readable medium storing instructions that, when executed by a processing unit, cause the processing unit to provide rendered image data to multiple client devices, by performing the steps of:
receiving a request from a first client device and a second client device to launch an application program for execution on a server device, wherein the application program is configured to operate in a full-screen display mode; and
in response, creating an execution environment for the application program that includes a first shim layer and a second shim layer residing between the application program and a runtime component, wherein the first shim layer is associated with the first client device and the second shim layer is associated with the second client device, and each of the first shim layer and the second shim layer is configured to:
disable the full-screen display mode;
intercept function calls related to displaying rendered images and execute the function calls to store the rendered image data in a buffer of the server device;
pass non-display oriented function calls to the runtime component to allow the application program to generate the rendered image data for display on the associated client device; and
prevent user inputs received at input devices associated with the server device from controlling operation of the application program.

12. The non-transitory computer readable medium of claim 11, further comprising determining whether a request for a selectable application list has been received, wherein the application program is included in the selectable application list.

13. The non-transitory computer readable medium of claim 11, wherein the runtime component includes an operating system.

14. The non-transitory computer readable medium of claim 11, wherein creating the execution environment further comprises altering an execution path of the application program.

15. The non-transitory computer readable medium of claim 14, wherein altering the execution path comprises creating a path to each of the first shim layer and the second shim layer such that the application program calls the first shim layer or the second shim layer for library calls.

16. The non-transitory computer readable medium of claim 11, wherein each of the first shim layer and the second shim layer is further configured to prevent the rendered image data from being copied to a display buffer associated with the server device.

17. The non-transitory computer readable medium of claim 16, wherein the buffer is stored in a system memory of the server device, and the rendered image data is transmitted from the buffer to the associated client device.

18. A server computer system, comprising:
a processing unit; and
a server process configured to execute on the processing unit and further configured to:
  receive a request from a first client device and a second client device to launch an application program for execution on a server device, wherein the application program is configured to operate in a full-screen display mode; and
  in response, create an execution environment for the application program that includes a first shim layer and a second shim layer residing between the application program and a runtime component, wherein the first shim layer is associated with the first client device and the second shim layer is associated with the second client device, and each of the first shim layer and the second shim layer is configured to:
  disable the full-screen display mode;
  intercept function calls related to displaying rendered images and execute the function calls to store the rendered image data in a buffer of the server device;
  pass non-display oriented function calls to the runtime component to allow the application program to generate the rendered image data for display on the associated client device; and
  prevent user inputs received at input devices associated with the server device from controlling operation of the application program.

19. The server computer system of claim 18, wherein the runtime component includes an operating system.

20. The computer system of claim 18, wherein, to create the execution environment, the server process is further configured to alter an execution path of the application program.

21. The computer system of claim 20, wherein, to alter the execution path, the server process is configured to create a path to each of the first shim layer and the second shim layer such that the application program calls the first shim layer or the second shim layer for library calls.

* * * * *